(12) United States Patent
Hess

(10) Patent No.: US 10,378,632 B2
(45) Date of Patent: Aug. 13, 2019

(54) TORQUE CONVERTER WITH TURBINE CLUTCH INCLUDING A SEPARATE PISTON

(71) Applicant: Schaeffler Technologies AG & Co. KG, Herzogenaurach (DE)

(72) Inventor: Timothy Hess, Westlake, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/479,365

(22) Filed: Apr. 5, 2017

(65) Prior Publication Data

US 2018/0291990 A1 Oct. 11, 2018

(51) Int. Cl.
*F16H 45/02* (2006.01)
*F16D 25/0632* (2006.01)

(52) U.S. Cl.
CPC ......... *F16H 45/02* (2013.01); *F16D 25/0632* (2013.01); *F16H 2045/021* (2013.01); *F16H 2045/0215* (2013.01); *F16H 2045/0263* (2013.01); *F16H 2045/0294* (2013.01)

(58) Field of Classification Search
CPC ............. F16H 45/02; F16H 2045/0263; F16H 2045/0215; F16H 2045/0205; F16H 2045/021; F16D 25/0362
See application file for complete search history.

(56) References Cited

U.S. PATENT DOCUMENTS

| 9,394,981 | B2 | 7/2016 | Lindemann et al. | |
|---|---|---|---|---|
| 2007/0074943 | A1 | 4/2007 | Hemphill et al. | |
| 2009/0014269 | A1 | 1/2009 | Ari et al. | |
| 2014/0097055 | A1 | 4/2014 | Lindemann et al. | |
| 2015/0021137 | A1 | 1/2015 | Lindemann et al. | |
| 2015/0068857 | A1* | 3/2015 | Lindemann | F16D 33/18 192/3.28 |
| 2015/0337935 | A1 | 11/2015 | Matsuoka | |
| 2016/0017971 | A1 | 1/2016 | Sayre et al. | |
| 2016/0116038 | A1* | 4/2016 | Depraete | F16H 41/30 192/3.29 |
| 2016/0123402 | A1* | 5/2016 | Avins | F16F 15/1232 60/338 |
| 2016/0160971 | A1* | 6/2016 | Depraete | F16H 45/02 192/3.29 |
| 2016/0160978 | A1* | 6/2016 | Depraete | F16H 45/02 192/3.29 |
| 2018/0051785 | A1* | 2/2018 | Gradolph | F16H 45/02 |

FOREIGN PATENT DOCUMENTS

JP 2004036634 A 2/2004

* cited by examiner

*Primary Examiner* — David J Hlavka

(57) ABSTRACT

A torque converter, including: a cover arranged to receive torque; an impeller including an impeller shell non-rotatably connected to the cover and at least one impeller blade connected to the impeller shell; a turbine including a turbine shell and at least one turbine blade connected to the turbine shell; an output hub connected to the turbine shell and arranged to non-rotatably connect to an input shaft for a transmission; and a turbine clutch including a piston non-rotatably connected to the turbine shell, and for a lock-up mode, axially displaceable to non-rotatably connect the piston and the impeller shell.

11 Claims, 5 Drawing Sheets

US 10,378,632 B2

TORQUE CONVERTER WITH TURBINE CLUTCH INCLUDING A SEPARATE PISTON

TECHNICAL FIELD

The present disclosure relates to a torque converter having a turbine clutch with an axially displaceable piston, separate from the turbine shell, for opening and closing the turbine clutch. The present disclosure also relates to a three or four-pass torque converter having a turbine clutch with an axially displaceable piston, separate from the turbine shell, as well as a cancellation chamber to reduce dynamic effects resulting from operation of the piston.

BACKGROUND

Known torque converters with a turbine clutch operate by axially displacing the turbine shell to open and close the turbine clutch and to transition between a torque converter mode (clutch open) and a lock-up mode (clutch closed). Displacing the turbine applies stress to the turbine blades and can reduce the durability of the turbine. Known torque converters with a turbine clutch have been limited to three-pass (three fluid circuits) designs.

SUMMARY

According to aspects illustrated herein, there is provided a torque converter, including: a cover arranged to receive torque; an impeller including an impeller shell non-rotatably connected to the cover and at least one impeller blade connected to the impeller shell; a turbine including a turbine shell and at least one turbine blade connected to the turbine shell; an output hub connected to the turbine shell and arranged to non-rotatably connect to an input shaft for a transmission; and a turbine clutch including a piston non-rotatably connected to the turbine shell, and for a lock-up mode, axially displaceable to non-rotatably connect the piston and the impeller shell.

According to aspects illustrated herein, there is provided a torque converter, including: a cover arranged to receive torque; an impeller including an impeller shell non-rotatably connected to the cover and at least one impeller blade connected to the impeller shell; a turbine including a turbine shell and at least one turbine blade connected to the turbine shell; an output hub connected to the turbine shell and arranged to non-rotatably connect to an input shaft for a transmission; a turbine clutch including a piston non-rotatably connected to the turbine shell and for a lock-up mode, axially displaceable to non-rotatably connect the piston and the impeller shell;

a first chamber bounded in part by the piston and the turbine shell; a second chamber bounded in part by the turbine shell and the impeller shell; and a seal sealed against the piston and the turbine shell and bounding, in part, the first and second chambers. The at least one turbine blade is located in the second chamber.

According to aspects illustrated herein, there is provided a torque converter, including: a cover arranged to receive torque; an impeller including an impeller shell non-rotatably connected to the cover and at least one impeller blade connected to the impeller shell; a turbine including a turbine shell and at least one turbine blade connected to the turbine shell; an output hub connected to the turbine shell and arranged to non-rotatably connect to an input shaft for a transmission; a turbine clutch including a piston non-rotatably connected to the turbine shell and for a lock-up mode, axially displaceable to non-rotatably connect the piston and the impeller shell; a first plate sealed against the piston; a first chamber formed in part by the turbine shell and the impeller shell; a second chamber formed in part by the piston and the turbine shell; a third chamber formed in part by the cover and the first plate; and a fourth chamber formed in part by the first plate and the piston and sealed from the first, second, and third chambers.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 5:
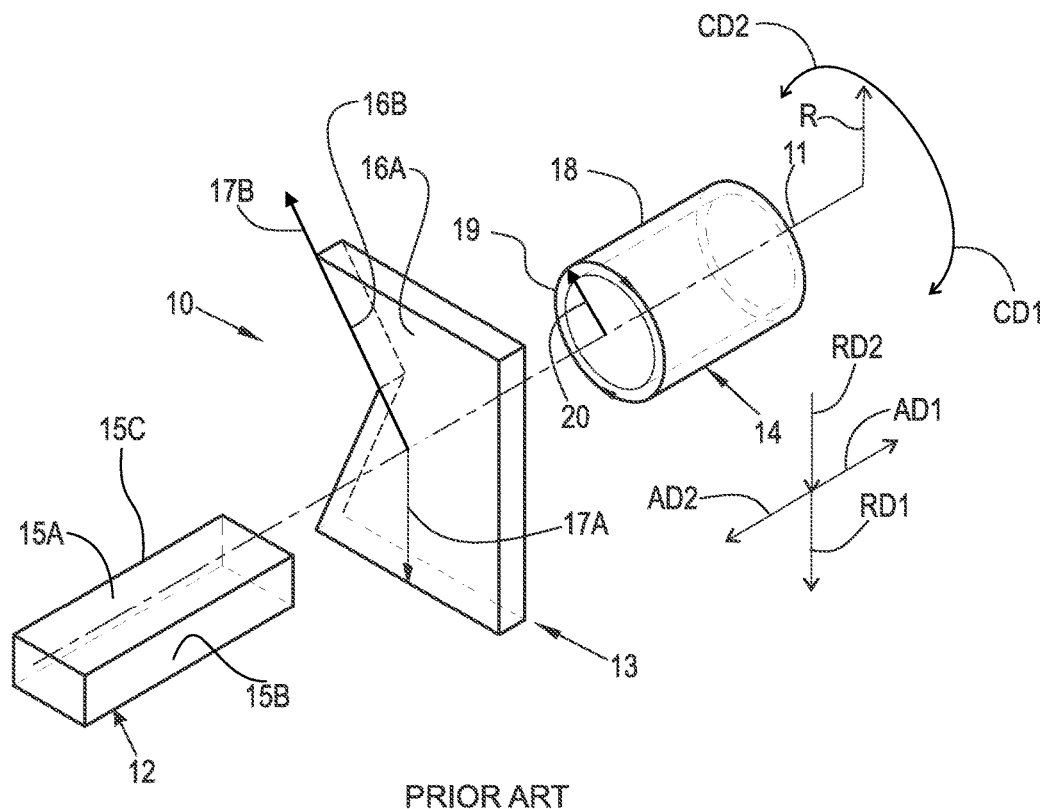

FIG. 5 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
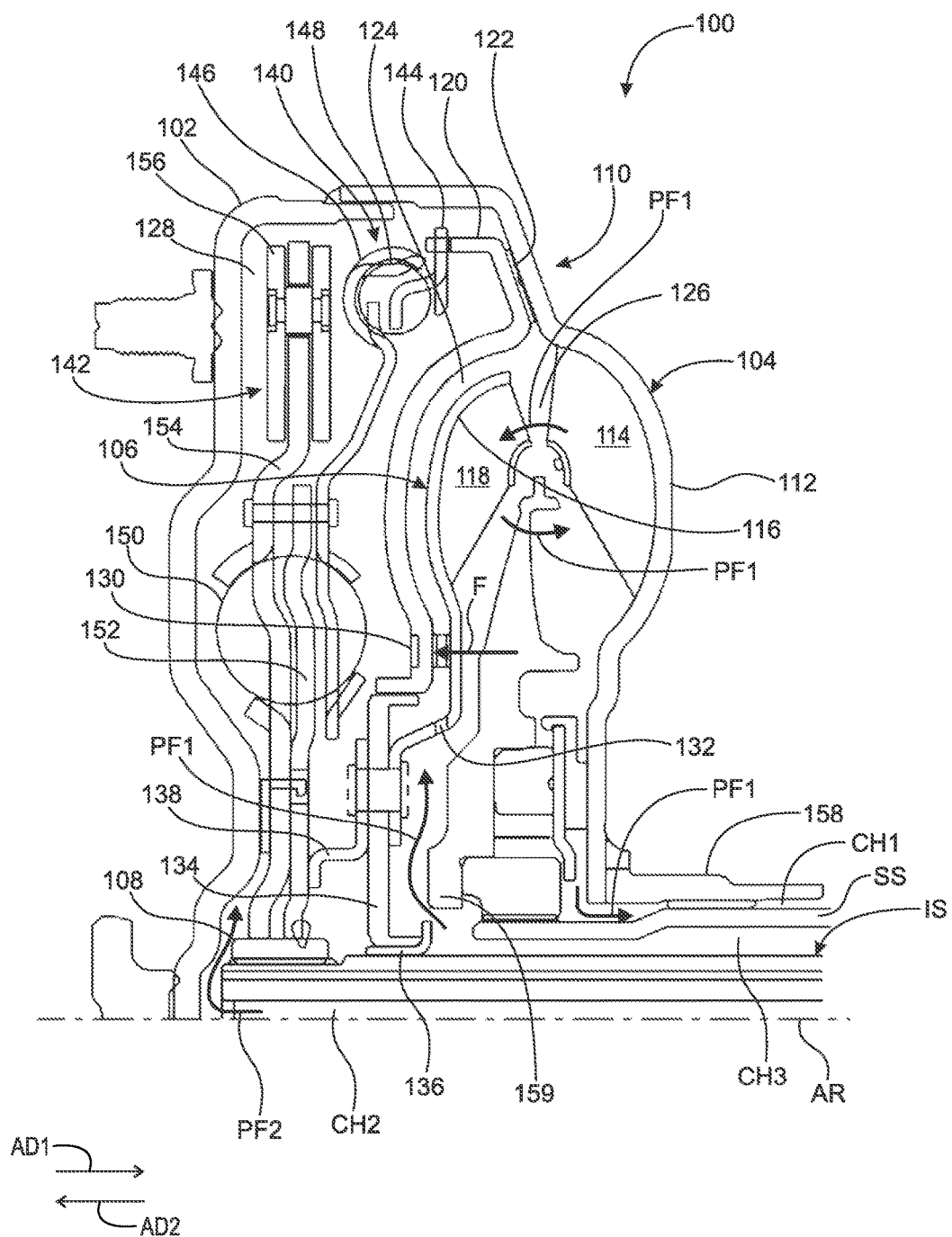
FIG. 1 is a partial cross-sectional view of a torque converter with a turbine clutch having a piston separate from a turbine shell.

FIG. 1 is a partial cross-sectional view of torque converter 100 with a turbine clutch having a piston separate from a turbine shell. Torque converter 100 includes: axis of rotation AR; cover 102 arranged to receive torque; impeller 104; turbine 106; output hub 108; and turbine clutch 110. Impeller 104 includes: impeller shell 112 non-rotatably connected to cover 102; and at least one impeller blade 114 connected to impeller shell 112. Turbine 106 includes: turbine shell 116; and at least one turbine blade 118 connected to turbine shell 116. Output hub 108 is connected to turbine shell 116 and is arranged to non-rotatably connect to input shaft IS for a transmission (not shown). By one component "engaged with" another component, we mean that the one component is in direct contact with the other component or the components are in contact with a mechanically solid intermediary or ancillary part. For example, a washer or coating could be disposed between the two components.

Turbine clutch 110 includes piston 120. Piston 120 is non-rotatably connected to turbine shell 116 and for a lock-up mode, piston 120 is axially displaceable to non-rotatably connect piston 120 and impeller shell 112. For example, piston 120 is displaceable in axial direction AD1 to non-rotatably connect piston 120 and impeller shell 112. In an example embodiment, clutch 110 includes friction material 122 between piston 120 and shell 112.

Torque converter 100 includes: chamber 124 formed or bounded, at least in part, by piston 120 and turbine shell 112; chamber, or torus, 126 formed or bounded, at least in part, by shells 112 and 116; and chamber 128 formed or bounded, at least in part, by cover 102 and piston 120. Blades 114 and 118 are located in chamber 126. Leaf spring 130: is located in chamber 124; is non-rotatably connected to turbine shell 116 and piston 120; enables axial displacement of piston 120 with respect to turbine shell 116, and transmit torque from piston 120 to shell 116. In an example embodiment, shell 116 includes at least one through-bore 132, wholly surrounded by material forming shell 116 and connecting chambers 124 and 126. In the example of FIG. 1, spring 130 applies force F to urge piston 120 in direction AD2.

For the lock-up mode, fluid pressure in chamber 128 is arranged to be greater than a combination of force F (when present) and fluid pressure in chamber 124 and 126, urging piston 120 in direction AD1. For a torque converter mode, in which piston 120 is rotatable with respect to shell 112, fluid pressure in chamber 124 is arranged to be greater than or equal to fluid pressure in chamber 128. In the lock-up mode and the torque converter mode, respective fluid pressures in chambers 124 and 126 are substantially equal.

In an example embodiment, torque converter 100 includes turbine hub 134 arranged to seal against transmission input shaft IS, for example, bushing 136 is sealed against hub 134 and shaft IS. Turbine shell 116 is non-rotatably connected to turbine hub 134, turbine hub 134 is connected output hub 108, and piston 120 is in contact turbine hub 134. In an example embodiment, torque converter 100 includes plate 138 in contact with hub 108 and non-rotatably connected to hub 134. In an example embodiment, turbine hub 134 bounds respective portions of chambers 124, 126 and 128.

In an example embodiment, torque converter 100 includes torsional vibration damper 140 and centrifugal pendulum 142. Damper 140 includes: drive plate 144 non-rotatably connected to piston 120; cover plate 146; spring 148 engaged with plates 144 and 146; spring 150 engaged with plate 146; and output flange 152 engaged with spring 150 and non-rotatably connected to hub 108. Pendulum 142 includes: flange 154 non-rotatably connected to plate 146 and engaged with spring 150; and pendulum masses 156 displaceable with respect to flange 154.

In the example of FIG. 1, for the torque converter mode, pressurized fluid PF1 is supplied to chambers 124 and 126 via channel CH3 formed by shaft IS and stator shaft SS and is circulated by blades 114 and 116 through stator 159. Pressurized fluid PF2 is supplied to chamber 128, via channel CH2 in shaft IS, at a fluid pressure less than that of fluid PF1. The pressure differential between PF1 and PF2, plus force F, displaces piston 120 in direction AD2, opening clutch 110. Torque received by cover 102 is transmitted to shell 112, which rotates blades 114. Blades 114 circulate fluid PF1 to rotate blades 118 and shell 116. Shell 116 transmits the torque received by the cover to hub 108. Pendulum 142 absorbs vibration transmitted to hub 108.

In the example of FIG. 1, for the lock-up mode, fluid pressure for PF2 is increased and fluid pressure for chambers 124 and 126 is reduced or kept the same. The preceding fluid pressure differential overcomes force F to displace piston 120 in direction AD1 to close clutch 110. Torque received by the cover is transmitted to drive plate 144 via shell 112 and piston 120. The torque on plate 144 is transmitted through damper 140 to flange 152 and hub 108. Pendulum 142 absorbs vibration transmitted to flange 152. Note that reducing fluid pressure in chambers 124, 126, and 128 can include venting the chambers to atmosphere.

Shell 120 is connected to hub 108 via damper 140. Therefore, limited rotation between shell 120 and hub 108 occurs due to the action of springs 148 and 150. Hub 134 is connected to hub 108 via damper 140. Therefore, limited rotation between hub 134 and hub 108 occurs due to the action of springs 148 and 150.

Figure 2:
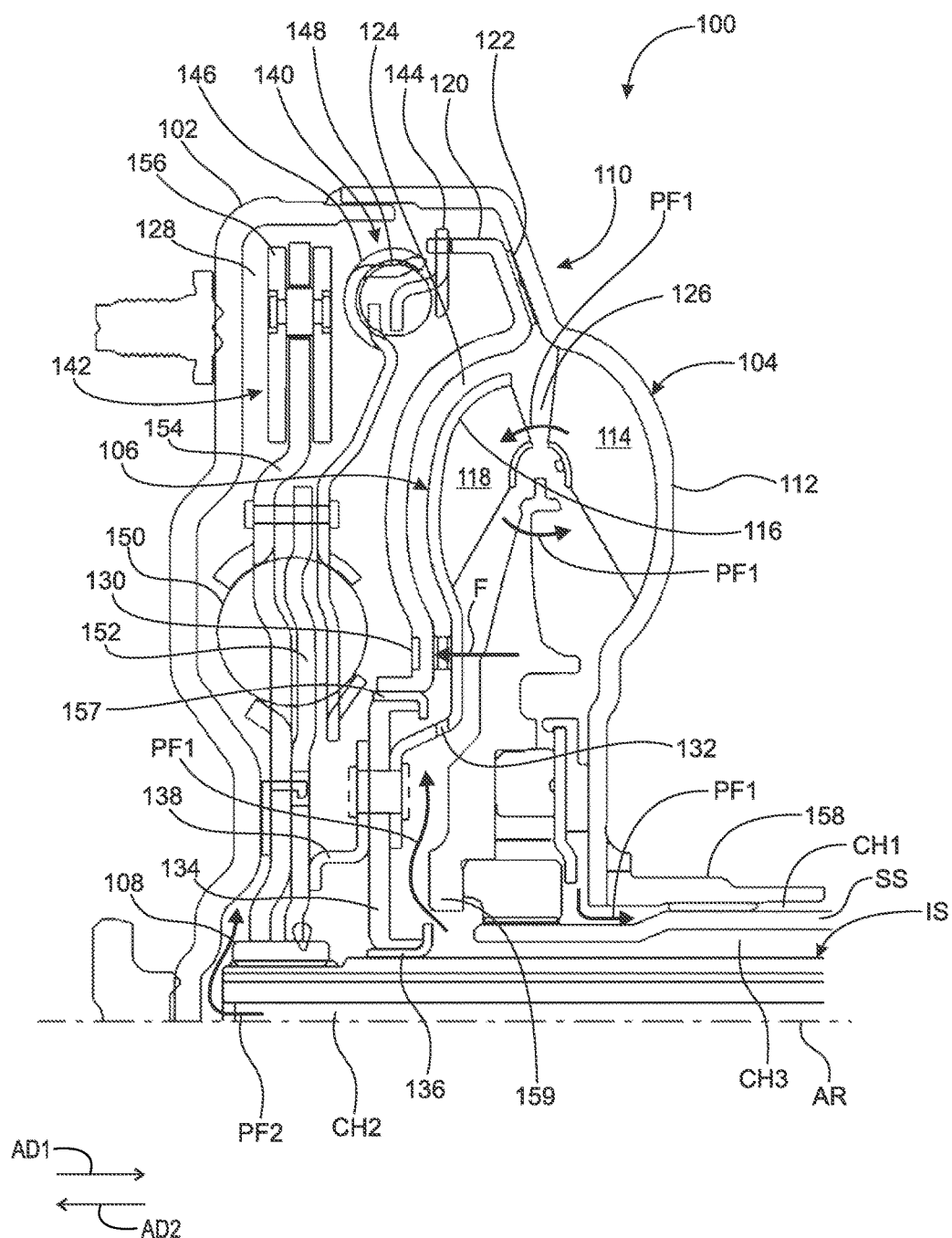
FIG. 2 is a partial cross-sectional view of the torque converter in FIG. 1 with a bushing between the piston and a turbine hub.

FIG. 2 is a partial cross-sectional view of torque converter 100 in FIG. 1 with a bushing between piston 120 and turbine hub 134. The discussion regarding torque converter 100 in FIG. 1 is applicable to torque converter 100 in FIG. 2 except as noted. In FIG. 2, bushing 157 has been added to the configuration shown in FIG. 1, in particular between piston 120 and turbine hub 134. Bushing 157 seals against piston 120 and hub 134 and seals chamber 124 from chamber 128.

Figure 3:
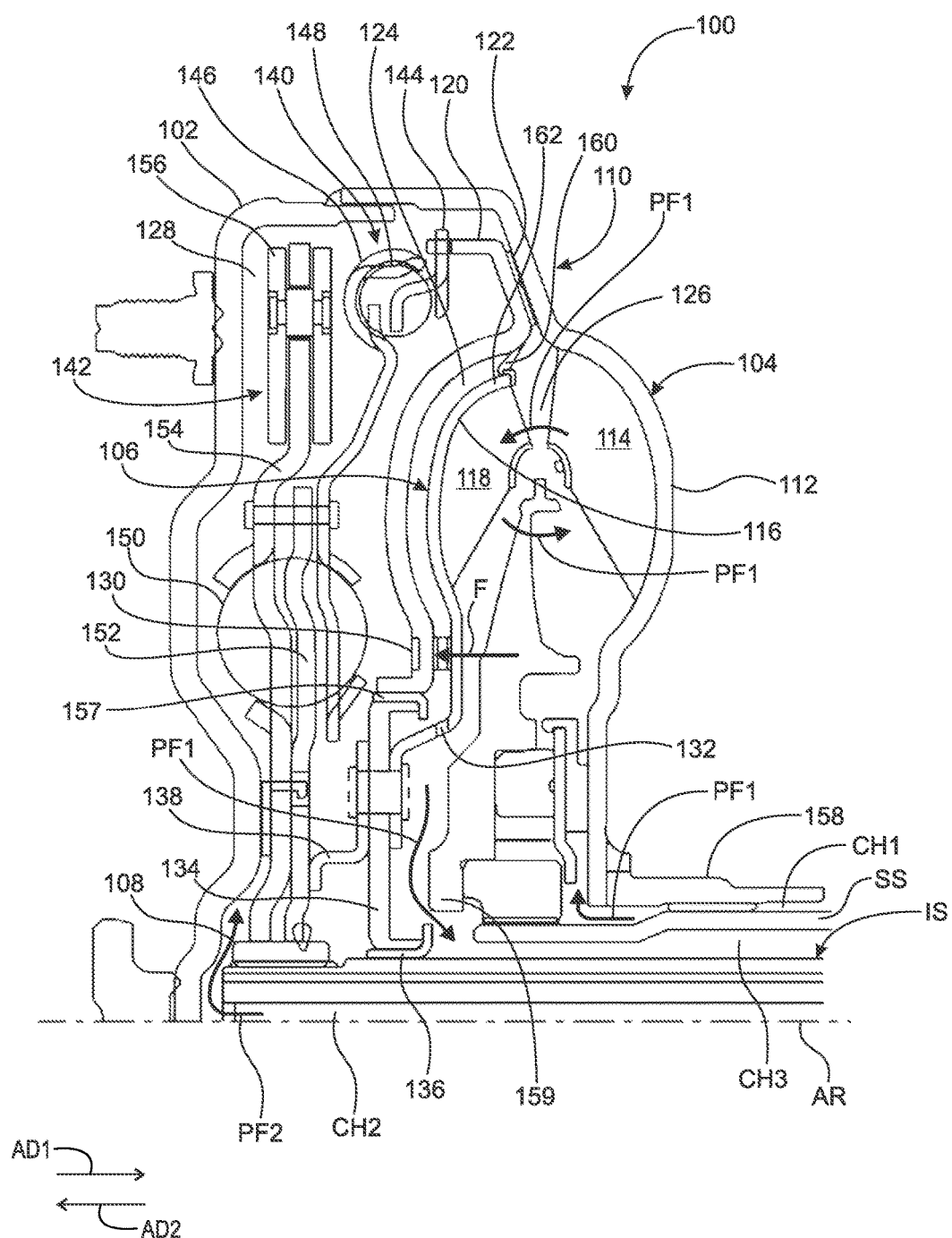
FIG. 3 is a partial cross-sectional view of the torque converter in FIG. 1 with a seal between the piston and the turbine shell.

FIG. 3 is a partial cross-sectional view of torque converter 100 in FIG. 1 with a seal between the piston and the turbine shell. The discussion regarding torque converter 100 in FIG. 2 is applicable to torque converter 100 in FIG. 3 except as noted. In FIG. 3, seal 160 has been added to the configuration shown in FIG. 2. Seal 160 is sealed against piston 120 and radially outermost portion 162 of turbine shell 116.

Figure 4:
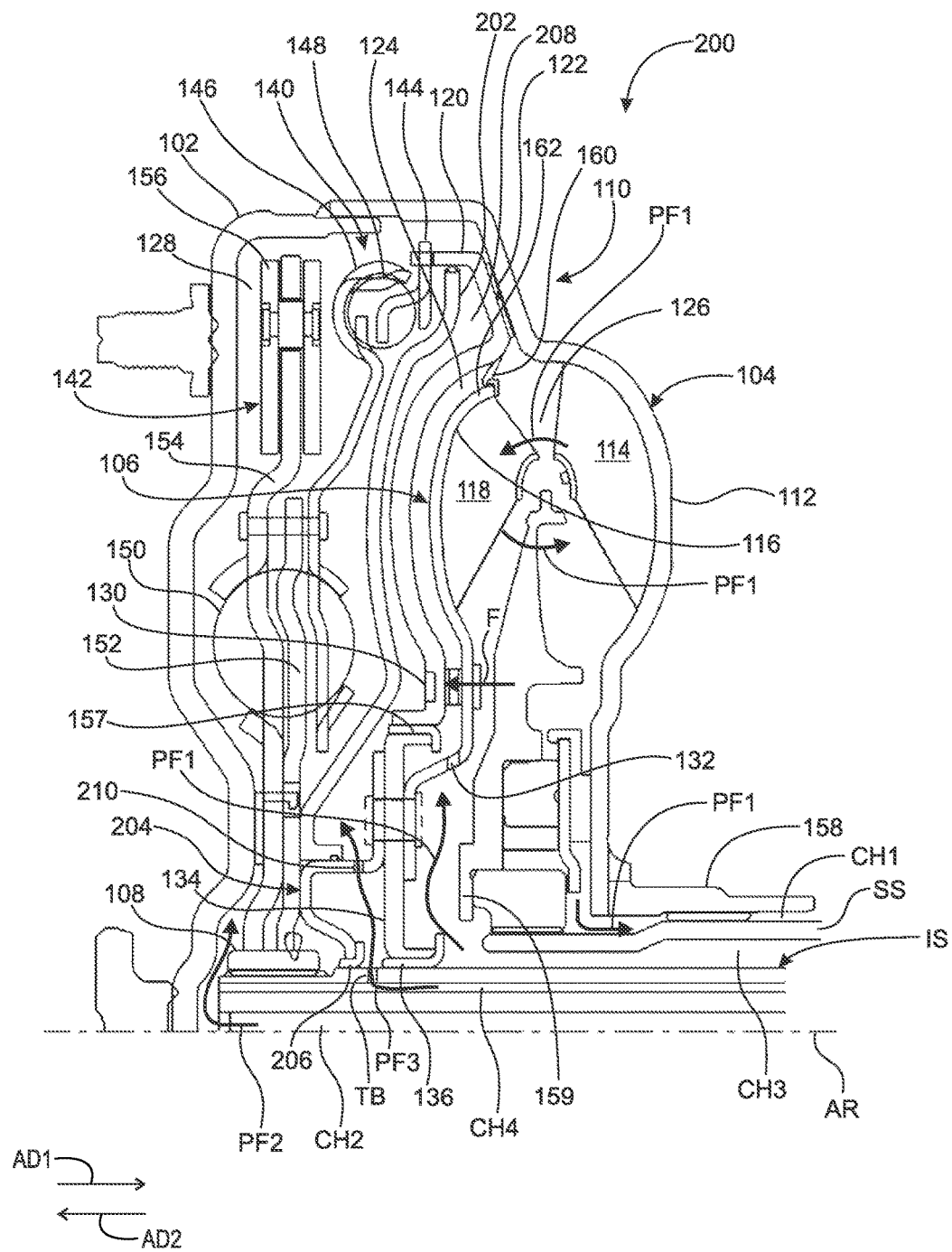
FIG. 4 is a partial cross-sectional view of a four-pass torque converter with a turbine clutch having a piston separate from a turbine shell and a separate apply chamber for the piston; and, FIG. 5 is a perspective view of a cylindrical coordinate system demonstrating spatial terminology used in the present application.

FIG. 4 is a partial cross-sectional view of four-pass torque converter 200 with a turbine clutch having a piston separate from a turbine shell and a separate apply chamber for the piston. The discussion for torque converter 100 in FIG. 3 is applicable to torque converter 200 in FIG. 4 except as noted. In FIG. 4: plate 202 has been added; plate 204 replaces plate 138 in FIG. 3; bushing 206 has been added; and apply chamber 208 is formed or bounded, at least in part, by plate 202 and piston 120. Plate 204 includes at least through-bore 210. Chamber 208 is sealed from chambers 124, 126, and 128 with the exception of through-bore(s) 210.

In the example of FIG. 4, for the torque converter mode, pressurized fluid PF1 is supplied to chambers 124 and 126 via channel CH3 and is circulated by blades 114 and 116 through stator 159. Pressurized fluid PF3 is supplied to chamber 208 at a fluid pressure less than that of fluid PF1, via channel CH4 in shaft IS, through-bore TB in shaft IS, and through-bore 210. The pressure differential between PF1 and PF3, plus force F, displaces piston 120 in direction AD2, opening clutch 110. Torque received by cover 102 is transmitted to shell 112, which rotates blades 114. Blades 114 circulate fluid PF1 to rotate blades 118 and shell 116. Shell 116 transmits the torque received by the cover to hub 108. Pendulum 142 absorbs vibration transmitted to hub 108.

In the example of FIG. 4, for the lock-up mode, fluid pressure for PF3 is increased and fluid pressure for chambers 124 and 126 is reduced or kept the same. The preceding fluid pressure differential overcomes force F to displace piston 120 in direction AD1 to close clutch 110. Torque received by the cover is transmitted to drive plate 144 via shell 112 and piston 120. The torque on plate 144 is transmitted through damper 140 to flange 152 and hub 108. Pendulum 142 absorbs vibration transmitted to flange 152. Note that reducing fluid pressure in chambers 124, 126, 128, and 208 can include venting the chambers to atmosphere.

Advantageously, torque converters 100 and 200 solve the problem noted above regarding the displacement of a turbine shell to open and close a turbine clutch and the resultant stress on turbine blades. Specifically, piston 120 is displaced in directions AD1 and AD2 to close and open clutch 110, respectively, while an axial position of turbine shell 116 and turbine blades 118 is relatively fixed (some axial displacement of shell 116 can occur due to circulation of fluid PF1 in torus 126). Eliminating the displacement of shell 116 to open and close clutch 110 eliminates the stress noted above.

The displacement of piston 120 in direction AD1 to close clutch 110 causes displacement and compression of fluid in chambers 124 and 126. The displacement and compression result in dynamic effects that can interfere with desired operation of clutch 110, reducing the controllability of clutch 110. Advantageously, because of seal 160, chamber 124 in FIG. 3 acts as a cancellation chamber to help neutralize the dynamic forces noted above and improve controllability of clutch 110. Advantageously, for torque converter 200, since the respective volumes of chambers 208 and 124 are relatively close (closer for example than the respective volumes of chambers 128 and 124 in torque converter 100 in FIG. 3), the dynamic effects associated with the closing of clutch 110 are even further diminished than is the case for torque converter 100 in FIG. 3.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
100 torque converter
AR axis of rotation
CH1 channel
CH2 channel
CH3 channel
CH4 channel
IS transmission input shaft
PF1 pressurized fluid
PF2 pressurized fluid
PF3 pressurized fluid
SS stator shaft
TB through-bore
102 cover
104 impeller
106 turbine
108 output hub
110 turbine clutch
112 impeller shell
114 impeller blade
116 turbine shell
118 turbine blade
120 piston
122 friction material
124 chamber
126 chamber or torus
128 chamber
130 leaf spring
132 through-bore
134 turbine hub
136 bushing
138 plate
140 torsional vibration damper
142 centrifugal pendulum
144 drive plate
146 cover plate
148 spring
150 spring
152 output flange 154 flange
156 pendulum mass
157 bushing
158 hub
159 stator
160 seal
162 outermost portion of shell 116
200 torque converter
202 plate
204 plate
206 bushing
208 chamber
210 through-bore

The invention claimed is:

1. A torque converter, comprising:
a cover arranged to receive torque;
an impeller including:
an impeller shell non-rotatably connected to the cover; and,
at least one impeller blade connected to the impeller shell;
a turbine including
a turbine shell; and,
at least one turbine blade connected to the turbine shell;
an output hub connected to the turbine shell and arranged to non-rotatably connect to an input shaft for a transmission;
a turbine clutch including a piston, the piston:
separate from the turbine shell;
non-rotatably connected to the turbine shell; and,
displaceable, in a first axial direction and for a lock-up mode, to non-rotatably connect the piston and the impeller shell;
a first chamber formed, at least in part, by the piston and the turbine shell; and,
a leaf spring located in the first chamber and non-rotatably connected to the turbine shell and the piston.

2. The torque converter of claim 1, further comprising:
a second chamber formed, at least in part, by the impeller shell and the turbine shell; and,
a through-bore in the turbine shell connecting the first and second chambers, wherein the at least one impeller blade and the at least one turbine blade are located in the second chamber.

3. The torque converter of claim 1, further comprising:
a turbine hub arranged to engage the transmission input shaft, wherein:
the turbine shell is non-rotatably connected to the turbine hub;
the turbine hub is connected to the output hub; and,
the piston is in contact with the turbine hub; or,
the torque converter further comprises a bushing sealed against the piston and the turbine hub.

4. The torque converter of claim 1, further comprising:
a second chamber bounded in part by the cover and the piston,
wherein:
for the lock-up mode, fluid pressure in the second chamber is arranged to be greater than a force urging the piston in a second axial direction, opposite the first axial direction; and,
for a torque converter mode:
the piston is rotatable with respect to the impeller shell; and,
the force is arranged to be greater than the fluid pressure in the second chamber.

5. The torque converter of claim 4, further comprising:
a third chamber formed in part by the impeller shell and the turbine shell, wherein:
the at least one turbine blade is located in the third chamber; and,
the turbine shell includes an opening connecting the first and third chambers.

6. The torque converter of claim 1, further comprising:
a turbine hub arranged to engage the transmission input shaft;
a second chamber bounded in part by the cover and the piston; and,
a third chamber bounded in part by the turbine shell and the impeller shell, wherein:
the at least one turbine blade is located in the third chamber;
the turbine shell is non-rotatably connected to the turbine hub;
the turbine hub is connected to the output hub; and,
the turbine hub bounds respective portions of the first, second and third chambers.

7. The torque converter of claim 1, further comprising:
a seal sealed against the piston and a radially outermost portion of the turbine shell.

8. The torque converter of claim 7, further comprising:
a first plate sealed against the piston;
a second chamber formed in part by the turbine shell and the impeller shell and containing the at least one turbine blade; and,
a third chamber formed in part by the first plate and the piston and sealed from the first and second chambers, wherein the first chamber is formed in part by the seal.

9. The torque converter of claim 8, wherein:
the turbine shell includes at least one through-bore; and,
the first chamber is sealed from the second and third chambers with the exception of the at least one through-bore.

10. The torque converter of claim 8, further comprising:
a fourth chamber formed in part by the cover and the first plate, wherein the third chamber is sealed from the first, second, and fourth chambers.

11. The torque converter of claim 7, further comprising:
a turbine hub:
arranged to engage the transmission input shaft; and,
connected to the output hub;
a first plate sealed against the piston;
a second chamber formed in part by the turbine shell and the impeller shell;
a third chamber formed in part by the cover and the first plate; and,
a fourth chamber:
formed in part by the first plate, the piston, and the turbine hub; and,
sealed from the first, second, and third chambers, wherein the first chamber is formed in part by the seal.

* * * * *